Patented Apr. 12, 1932

1,854,062

UNITED STATES PATENT OFFICE

PAUL D. POTTER AND RAYMOND T. METZGER, OF WINNETKA, ILLINOIS, ASSIGNORS TO SPRAGUE, WARNER & COMPANY, OF CHICAGO, ILLINOIS, A CORPORATION OF ILLINOIS

PROCESS FOR PRODUCING A BEVERAGE SYRUP TEA

No Drawing.    Application filed April 21, 1930.   Serial No. 446,179.

This invention relates to the process for producing a beverage syrup tea and has for its object the preparation of a beverage syrup which contains the water soluble extractives and the flavoring and aromatic substances of tea in substantial quantities, is substantially clear and free from cloudiness and sedimentitious material and can be so packed that it will not undergo decomposition and will indefinitely remain substantially clear and free from sediment, attractive, sound and merchantable, and can be used promptly after making or at any time after suitable packing to prepare by dilution with water, a plain beverage which is pleasing, clear, sound, attractive, palatable and merchantable, and can be kept in that condition indefinitely after sterilization in sealed packages, or can be used promptly after making, or at any time after packing to prepare a carbonated beverage, by dilution with carbonated water, which is clear, sound, attractive, palatable, and merchantable, and when packed in suitable containers will so remain indefinitely.

To our knowledge, beverage syrups and beverages have heretofore been made which contained extractives obtainable from tea by means of special solvents. Products made according to that procedure, however, do not possess the flavor of tea to a satisfactory degree and are noticeably lacking in water-soluble constituents of tea which contribute largely to the character of beverage tea. Efforts have also been made to prepare satisfactory beverage syrups which would contain the water-soluble extractives of tea in material quantities, but such efforts have been unsuccessful in part at least, because of the markedly cloudy character and the presence of sedimentitious material in the resulting syrups, and consequently in beverages made therefrom.

The information gained by us through experimentation which led to the development and the perfection of our process is as follows:

(a) When tea is extracted by means of hot water in such a way as to obtain a concentrated solution suitable for preparing a beverage syrup, the tea fragments, commonly called tea dust, can be removed by ordinary filtration.

(b) When the filtered or unfiltered extract cools, however, a precipitate separates out which is of colloidal character, will not settle appreciably during many hours, cannot be removed by practical filtrations and, in quantity, is sufficient to render the liquid opaque.

(c) If the extract obtained as described under (a) is acidified while hot, the precipitate which develops on coolng is of somewhat more filterable character, but due to the disposition of the material which separates to super-saturate the solution the clear filtrate slowly becomes cloudy.

(d) If a suitable acid is added to the liquid obtained as under (b), i. e. after cooling and after formation of the colloidal precipitate, further precipitation appears to take place and a change is brought about in the character of the precipitate, as a whole, which is of the nature of coagulation, and which in degree is dependent upon the kind and quantity of acid added. In general, clarification of the supernatant liquid is more perfect when efficient inorganic acids such as sulphuric or phosphoric or mixtures of such acids are used, than when the more desirable organic acids such as citric, tartaric or malic or mixtures of such acids are used, and further these precipitates show less tendency to return to colloidal form when produced by means of inorganic than with organic acids. These differences tend to grow less the more the extract experiences the effect of heat prior to acidification. The liquid phase is therefore filterable from the precipitate by practical means with variable degrees of success, depending upon the kind and quantity of acid present, and upon the extent to which the extract has been heated. The disposition of the filtrates to cloud because of supersaturation depends upon the time which is allowed to pass between acidification and filtration.

(e) When the filtered or unfiltered extract as obtained under (a) is processed under pressure at a temperature above that of boiling water, material sedimentation takes place as in the case of beverage tea (see Metzger and Potter Patent No. 1,813,120) and a clear, filterable, hot liquid is obtainable if removed from the retort promptly after blowing off the latter. This liquor on cooling, however, throws out a colloidal precipitate in character similar to that described under (b).

(f) When the solution obtained as described under (a) is acidified prior to cooling, or prior to processing as described under (e), or the hot liquor obtained as described under (e) is acidified, the precipitate thrown out on cooling is not highly colloidal in character and can be more or less readily removed by practical filtrations, but subsequently the tendency of the filtrate, to become cloudy because of the phenomenon of supersaturation is more marked than in the case of acidification after cooling.

(g) When the extract obtained as described under paragraphs (a) and (e) is suitably acidified after cooling and after formation of the colloidal precipitate, the change which takes place is in general as described under paragraph (d), but there is the difference that the clarification of the supernatant liquor which is accomplished by means of the more desirable organic acids is highly satisfactory and practically equal to that accomplished by the less desirable inorganic acids. Further, under such circumstances, the more desirable organic acids render the system filterable or otherwise separable, the solution from the insoluble material, by practical means, and a clear filtrate readily obtainable, which will not develop sediment on standing and is suitable for the preparation of a beverage syrup containing the water-soluble, flavoring and aromatic substances of tea in sufficient quantities to impart the character of tea to beverages made therefrom.

(h) When a beverage syrup is desired which contains the several substances which impart character to beverage tea, and in addition the flavor and aroma of one or more suitable essential oils, such as oil of lemon, they can be conveniently incorporated by agitating or otherwise mixing the oil or oils with the extract after acidification, but before filtration as described in paragraph (g) without attendant turbidity in the filtrate due to insoluble constituents of the oils which in fine state of division pass through ordinary filters, because of the fact that the precipitate acts as a filtration medium and removes substantially all of such constituents during the filtration.

The method of preparing a beverage syrup from tea as a base devised by us is the logical result of having acquired the information set forth in paragraphs (a) to (h), inclusive, by laboratory experimentation, and consists, in general, of making a concentrated water extract of tea by treating tea with water for a suitable period of time, or by concentrating a more dilute extract prepared in the same way, acidifying, and adding other flavoring substances, if desired, before or after removal of the extracted leaves, filtering or otherwise obtaining from the mass a substantially clear liquid and adding thereto sugar or other sweetening material. For the purposes of immediate beverage preparation, the syrup may be used as so obtained or after sterilization by means of heat. For future use it is packed hot in sealed containers or processed in such containers, after packing by means of heat.

In practicing our invention, we prefer to extract tea with water in the ratio of approximately 1 to 14 by heating the mixture to incipient boiling for about one-half hour, to expel the liquid from the mass so obtained by means of a juice press, to submit the liquid, while contained in a retort, under a pressure of ten pounds per square inch above that of the atmosphere, to the action of heat at a temperature of approximately 240° F. for a period of two hours, to remove the liquid, cool it to 50° F. or lower, to dissolve therein after precipitation is well developed 0.5% of citric acid, to allow it to stand over night under conditions such that its temperature will not rise, to incorporate one ten thousandth part of the desired essential oil by means of agitation, to remove the insoluble materials while the mixture is cold with the aid of a filter prepared with paper mass, and to dissolve in the clear filtrate so obtained a quantity of sugar equal to one-half of its weight. In order to insure sanitation in the preparation of beverages from the syrup so obtained, we prefer to heat the latter to 180° F. shortly prior to dilution. When it is desired to preserve the syrup for future use, we prefer to pack it at 180° F. in sealed containers. We recognize, however, that many slight modifications of time, temperature, degree and kind of acidity in this procedure are possible, and all such modifications are a part of our knowledge and of this application.

We claim:

1. Process for making beverage syrup of tea comprising: acidifying a concentrated water extract of tea; separating the insoluble from the soluble parts of the acidified extract; and sweetening the clarified liquid resulting from the separation.

2. Process for making beverage syrup of tea comprising: extracting tea by means of acidulated water; separating the insoluble from the soluble parts; and sweetening the clear liquid resulting from the separation.

3. Process for making beverage syrup of tea comprising: subjecting a concentrated water extract of tea to the intensive action of heat; acidifying the heat treated extract; separating the clarified liquid from the residue precipitated by the acidification; and sweetening the clarified liquid.

4. Process for making beverage syrup of tea comprising: subjecting an acidulated concentrated water extract of tea to the intensive action of heat; separating the insoluble from the soluble parts; and sweetening the clarified liquid.

5. Process for making beverage syrup of tea comprising: subjecting a concentrated water extract of tea under pressure to the action of heat at a temperature above that of boiling water; acidifying the heat treated extract; filtering the cooled acidified liquid to separate it from the precipitate thrown down by the reactions in the previous steps; and dissolving a substantial quantity of sugar in the filtrate.

6. Process for making beverage syrup of tea comprising: subjecting an acidulated concentrated water extract of tea under pressure to the action of heat at a temperature above that of boiling water; filtering the cooled acidified liquid to separate it from the precipitate thrown down by the reactions of the previous steps; and dissolving a substantial quantity of sugar in the filtrate.

In testimony whereof we affix our signatures.

PAUL D. POTTER.
RAYMOND T. METZGER.